(12) United States Patent
Wiezorek (10) Patent No.: US 8,191,449 B2
(45) Date of Patent: Jun. 5, 2012

(54) POSITION ADJUSTABLE SUPPORT FOR A CUTTING DEVICE

(75) Inventor: Steven R. Wiezorek, Baltimore, MD (US)

(73) Assignee: Black and Decker, Newark, DE (US)

( * ) Notice: Subject to any disclaimer, the term of this patent is extended or adjusted under 35 U.S.C. 154(b) by 563 days.

(21) Appl. No.: 12/360,592

(22) Filed: Jan. 27, 2009

(65) Prior Publication Data

US 2010/0186567 A1  Jul. 29, 2010

(51) Int. Cl.
*B27B 27/08* (2006.01)
*B27B 27/10* (2006.01)
*B27B 5/20* (2006.01)

(52) U.S. Cl. .............................. 83/34; 83/473; 83/471.3

(58) Field of Classification Search ........... 83/34, 477.1, 83/471.3, 469, 676, 472, 473, 809, 810, 471.1, 83/471.2
See application file for complete search history.

(56) References Cited

U.S. PATENT DOCUMENTS

| 5,080,152 | A | 1/1992 | Collins et al. | |
|---|---|---|---|---|
| 6,431,042 | B1 * | 8/2002 | Brault et al. | 83/471.3 |
| 2003/0097920 | A1 * | 5/2003 | Ransom et al. | 83/471.3 |
| 2006/0005679 | A1 | 1/2006 | Gehret et al. | |
| 2007/0234864 | A1 * | 10/2007 | Bettacchini | 83/471.3 |
| 2009/0107316 | A1 * | 4/2009 | Thomas | 83/471.3 |
| 2010/0162867 | A1 * | 7/2010 | McCracken et al. | 83/471.3 |
| 2011/0067544 | A1 * | 3/2011 | Glomb, Sr. | 83/522.19 |

* cited by examiner

*Primary Examiner* — Sean Michalski
(74) *Attorney, Agent, or Firm* — Edell, Shapiro & Finnan, LLC (57) ABSTRACT

The present invention is directed toward a repositioning device for a tool such as miter saw. The device includes a tool platform rotationally coupled to a base platform via a reorientation mechanism. The tool platform supports the miter saw. The base platform connects directly to a workbench, or connects to a support assembly that supports the cutting tool on a supporting surface.

21 Claims, 8 Drawing Sheets

POSITION ADJUSTABLE SUPPORT FOR A CUTTING DEVICE

FIELD OF THE INVENTION

This invention relates to a position-adjustable support for a tool such as a cutting device and, in particular, to a stand for a miter saw including a support platform that rotates with respect to a base.

BACKGROUND OF THE INVENTION

Workers in the construction industry require a stable work surface at a work site to support their tools. A portable workbench is particularly useful because it supports a tool in an easy-to-access, elevated position. A typical workbench includes a horizontal crossbeam supported over a surface by a series of legs. The tool is secured to the crossbeam, providing a stable surface on which to operate the tool. The beam further includes a work stop or work support adapted to support the distal end of the workpiece extending from the cutting deck.

Workbenches are particularly useful in supporting cutting devices such as miter saws. A miter saw makes cuts by pulling or pivoting a spinning circular saw blade down onto a workpiece of material in a short, controlled, chopping motion. The workpiece (e.g., a piece of wood) is typically held against a fence, which provides the cutting angle between the blade and the longest workpiece edge. In conventional miter saws, the fence is fixed in a position generally parallel to the crossbeam of the workbench supporting the miter saw. In use, a workpiece is placed on the fence, with one edge oriented under the saw blade and the opposite (distal) end supported by a support connected to the workbench.

Since the fence is fixed, the miter index is changed by altering the drop angle of the blade with respect to the fence. For example, the cutting deck, to which the blade is coupled, may rotated left or right to set it at a desired angle with respect to the fence. A compound feature (i.e., a compound miter saw) further allows the angle of the cutting blade to be changed relative to the horizontal plane. Thus, the blade can be angled left or right (called the miter angle), as well as be tilted side to side (called the bevel angle) to provide for bevel cutting.

While conventional workbenches provide adequate support for saws with stationary fences, problems arise when the saw includes adjustable fences. These saws include a stationary cutting deck and fences that are repositionable along the deck. These tools present unique challenges because, during operation, the fences may not position the workpiece such that it runs parallel to the crossbeam of the workbench. For example, the distal end of a workpiece (i.e., the end positioned away from the cutting blade) may not be properly supported by the bench's crossbeam, work stop, or work support. This, in turn, makes it more difficult to control the position of the workpiece on the cutting deck.

Thus, it would be desirable to provide a device operable to selectively reposition the tool with respect to a workbench.

SUMMARY OF THE INVENTION

The present invention is directed toward a tool repositioning assembly. The tool repositioning assembly includes a tool platform, a base, and a reorientation mechanism interposed between the tool platform and the base. The tool platform supports a tool such as a miter saw with repositionable fences. The base couples to a workbench such as a miter saw stand. The reorientation mechanism permits the rotation of the tool platform with respect to the base, and vice versa. In operation, the tool is coupled to the tool platform of the repositioning assembly, which, in turn, is coupled to the workbench via the base. Once the miter index is determined, the tool platform is selectively rotated to align a fence and/or workpiece such that it is generally parallel to the crossbeam of the workbench. With this configuration, the cutting tool may be positionally adjusted with respect to the workbench to provide maximum support for the workpiece.

BRIEF DESCRIPTION OF THE FIGURES

Like reference numerals have been used to identify like elements throughout this disclosure.

DETAILED DESCRIPTION OF THE INVENTION

Figure 1:
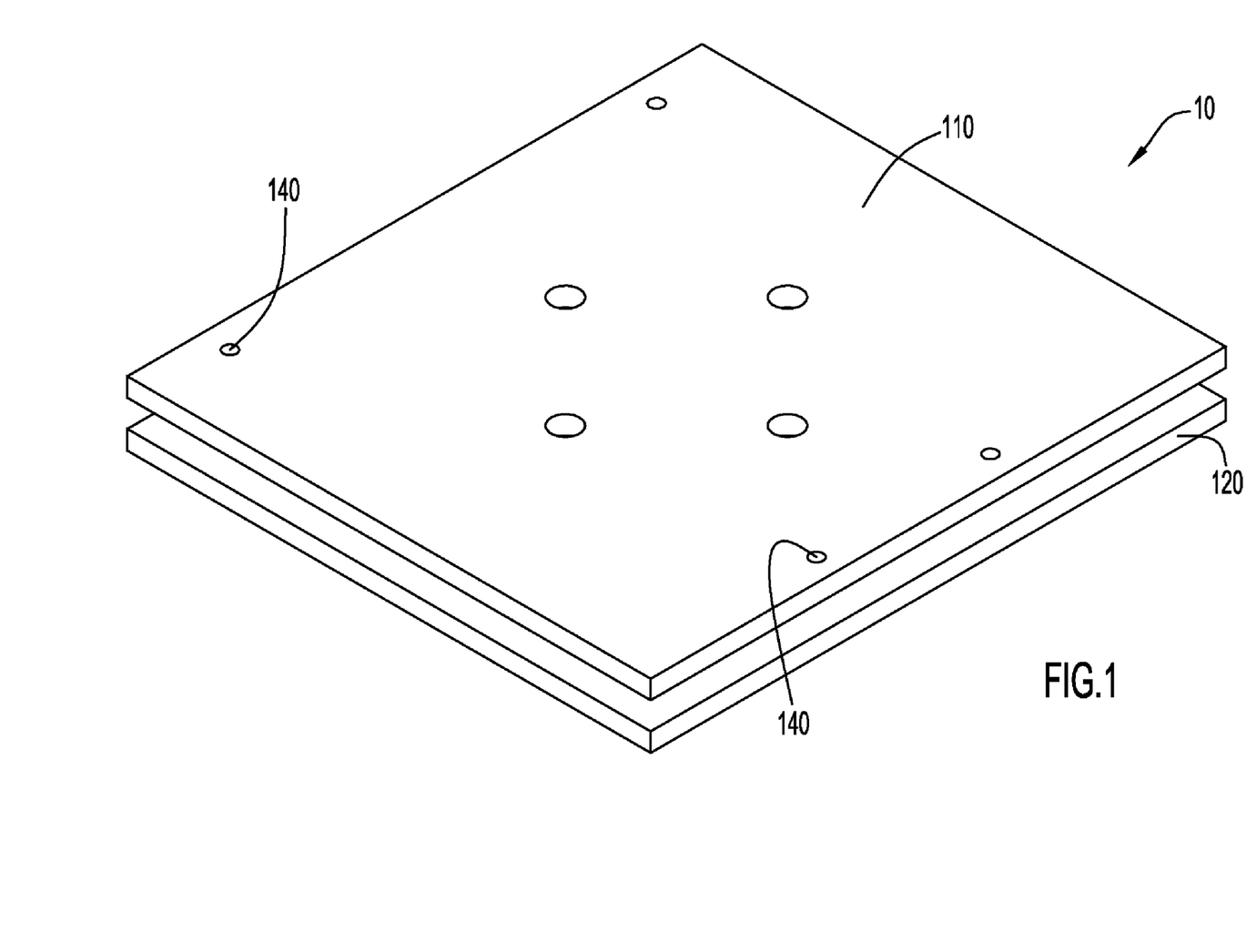
FIG. 1 illustrates a perspective view of a tool repositioning assembly in accordance with an embodiment of the invention.
Figure 2:
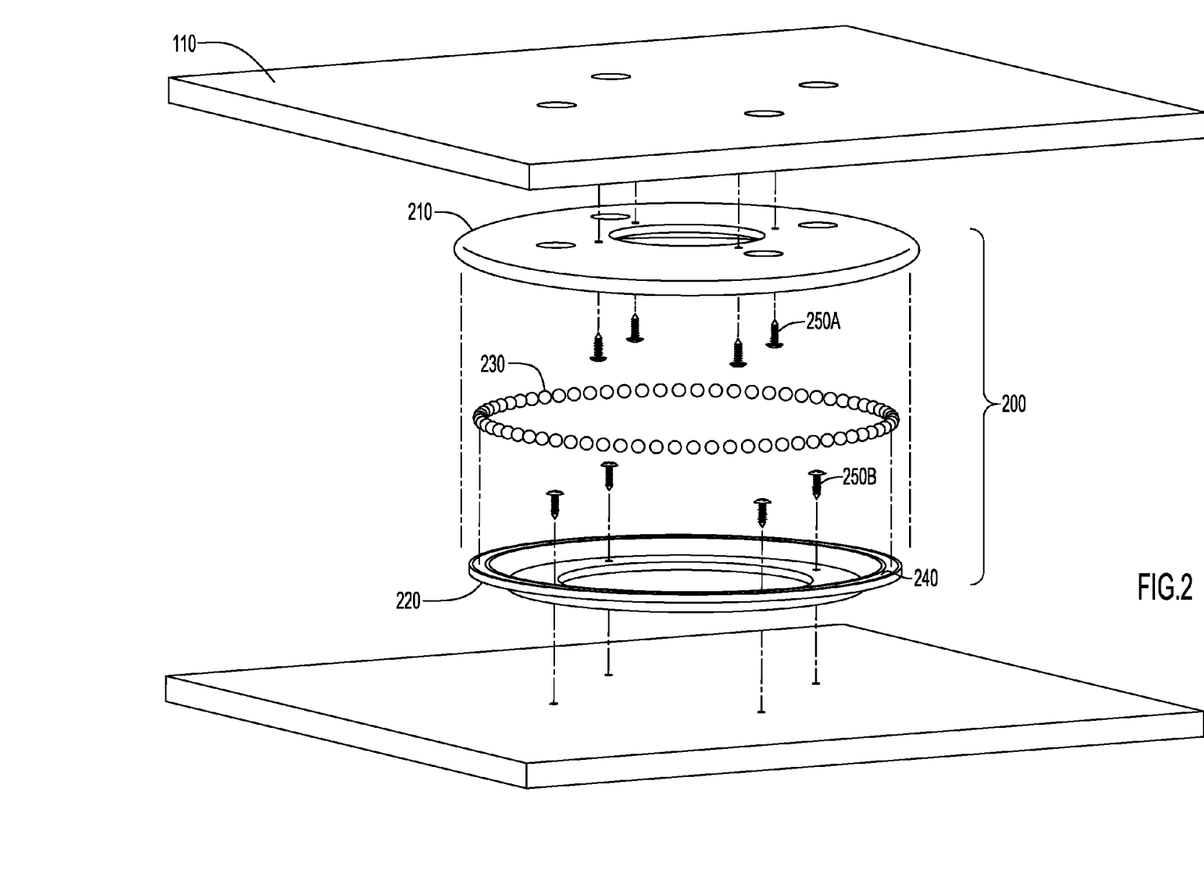
FIG. 2 illustrates and exploded view of the support device of FIG. 1.

FIGS. 1 and 2 illustrate a repositionable tool assembly in accordance with an embodiment of the invention. As illustrated, the repositionable tool assembly 10 includes a tool platform 110 coupled to a base 120 via a reorientation mechanism (200 in FIG. 2). The tool platform 110 may be a generally planar element, including a connection mechanism to facilitate the coupling of the tool to the platform 110. As illustrated, the tool platform 110 includes one or more connection points 140 that receive fasteners that secure the tool to the platform. The fasteners may include, but are not limited to, bolts, screws, etc. In operation, the connection points 140 align with corresponding connection points on the tool. Fasteners are inserted through the respective connection points, fastening the tool to the tool platform 110.

Figure 3:
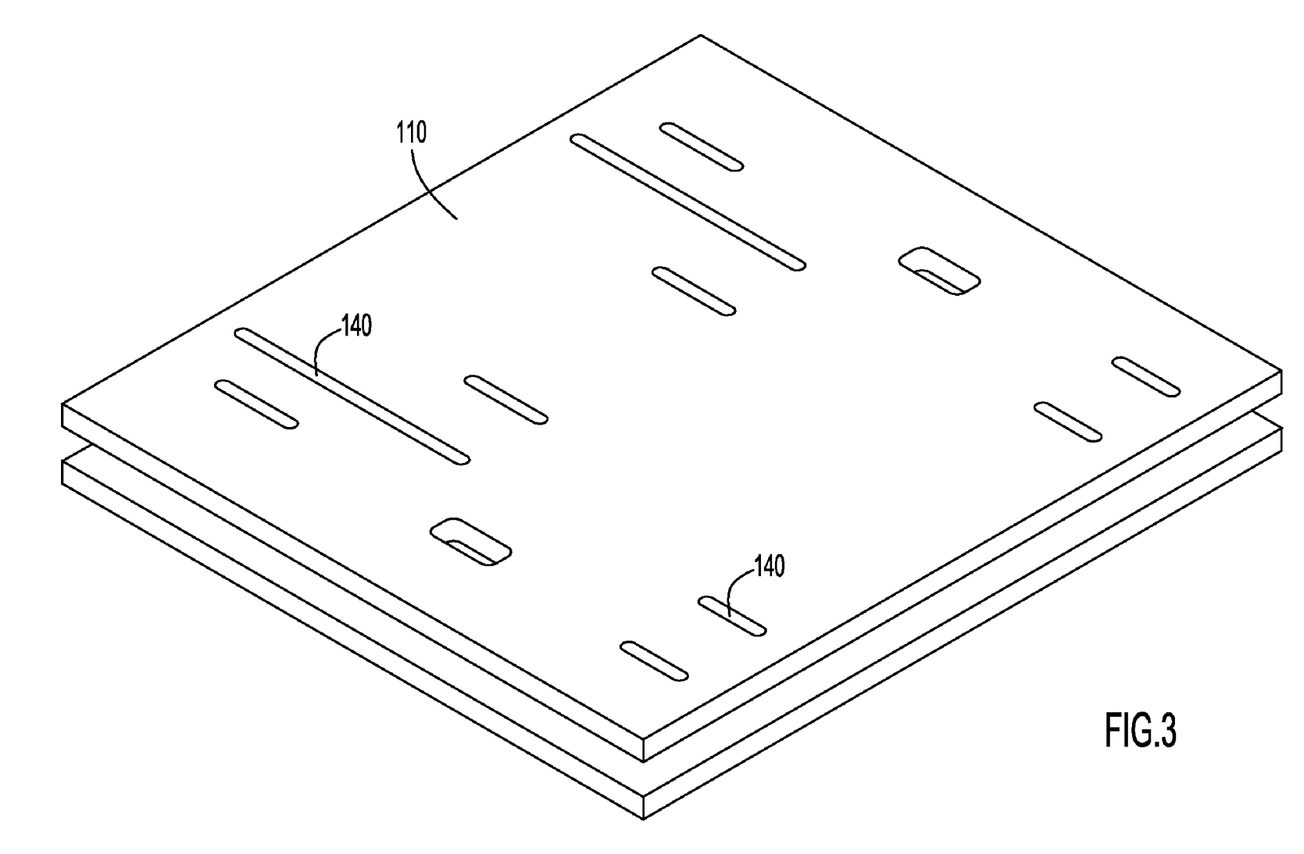
FIG. 3 illustrates a perspective view of a tool repositioning assembly in accordance with another embodiment of the invention.

The connection mechanism may further be configured as a universal connection mechanism. Referring to FIG. 3, the connection points 140 on the tool platform 110 include a plurality of generally elongated mounting slots spaced at predetermined locations. Each slot may be selectively used to provide an appropriate connection between the tool and the tool platform 110. In operation, the tool is secured to the tool platform via one or more fasteners such as a bolt, screw, etc. The fastener extends through an associated slot and into corresponding slot in the tool platform 110. Each fastener may be repositioned along each slot to further accommodate the connection of the tool platform 110 to the tool. With this configuration, the connection mechanism is a universal connection that accommodates tools possessing varying connection point layouts.

Figure 4:
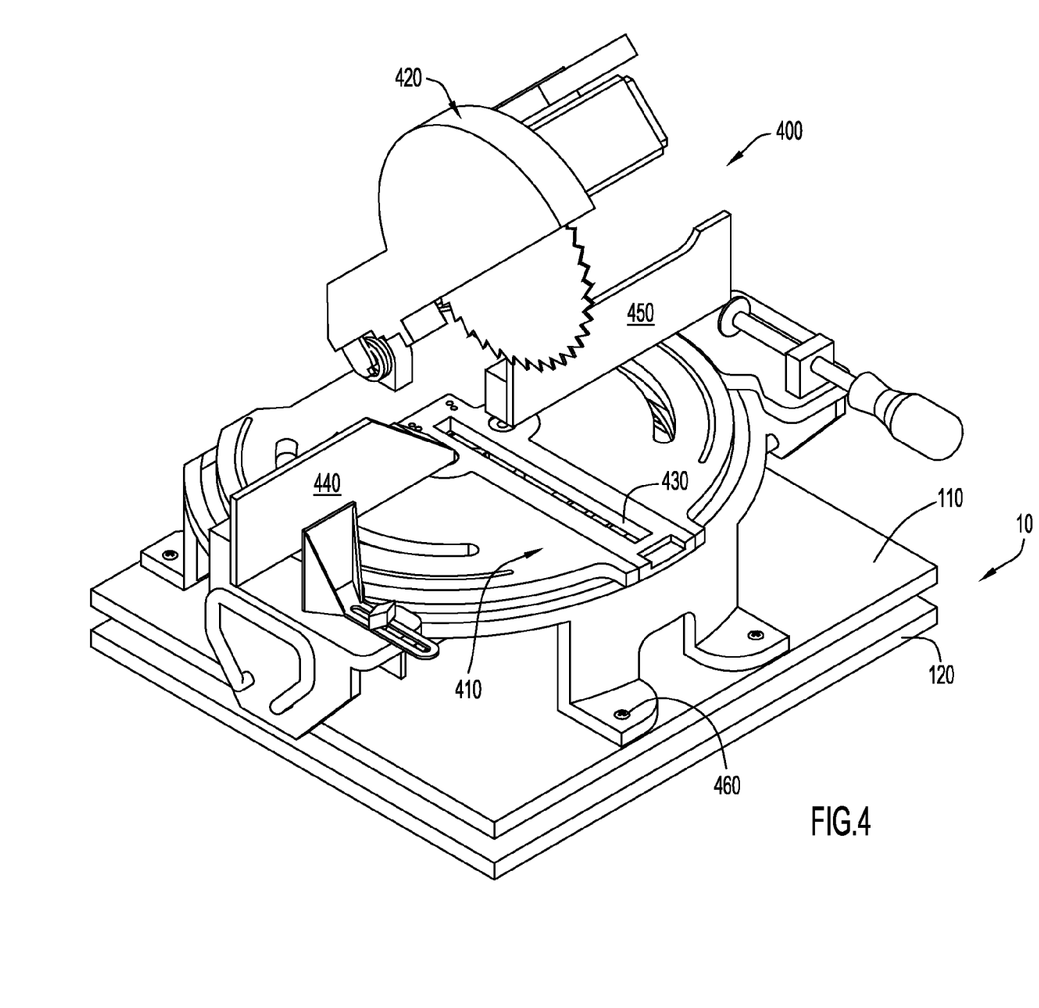
FIG. 4 illustrates the tool repositioning assembly of FIG. 1 with a cutting device secured thereto.

The tool platform 110 may support a tool with workpiece supports that are repositionable. By way of specific example, the tool may be a cutting device with fences adapted to move along the cutting deck to provide the desired miter index. As shown in FIG. 4, the cutting tool may be a miter saw 400 such as that disclosed in U.S. Patent Application Publication No. 2008/0041211 (Gibbons et al.), the disclosure of which incorporated herein by reference in its entirety. Briefly, the miter saw 400 includes a cutting deck 410 and a saw 420. The cutting deck 410 couples to the tool platform 110 of the tool repositioning assembly 10. By way of example, the cutting deck 410 may be secured to the tool platform 110 via fasteners 460 that engage the connection points 140 formed into the tool platform.

The saw 420 may be a drop/chop saw with a rotating circular saw blade coupled to the cutting deck 410. The cutting deck 410 includes a cutting area with a kerf slot 430. The cutting deck 410 further includes pivoting fences that guide a workpiece toward the cutting area (and thus the saw 420) at a preselected angle. Specifically, a first fence 440 may be oriented on one side of the kerf slot 430, while a second fence 450 is oriented on the other side of the kerf slot 430. Together, the fences 440, 450 define an angle that is bisected by the kerf slot 430. The angle of each fence 440, 450 may be altered by pivoting the fences about their respective pivot points. By way of example, the fences may rotate 88° clockwise and 88° counterclockwise from a normal 0° reference point oriented perpendicular to the drop direction of the blade of the cutting device. Thus, the miter index is achieved by angularly repositioning a fence 440, 450 on the cutting deck 410, which, in turn, alters the angle of the workpiece with respect to the saw blade. Once set, the saw blade acts on the workpiece, creating the miter angle.

The miter saw 400, furthermore, may be utilized with an angle gauge (not illustrated) that measures the angle between two intersecting surfaces such as conjoined walls as disclosed in the above Application Publication to Gibbons et al. already incorporated by reference in its entirety.

Figure 5:
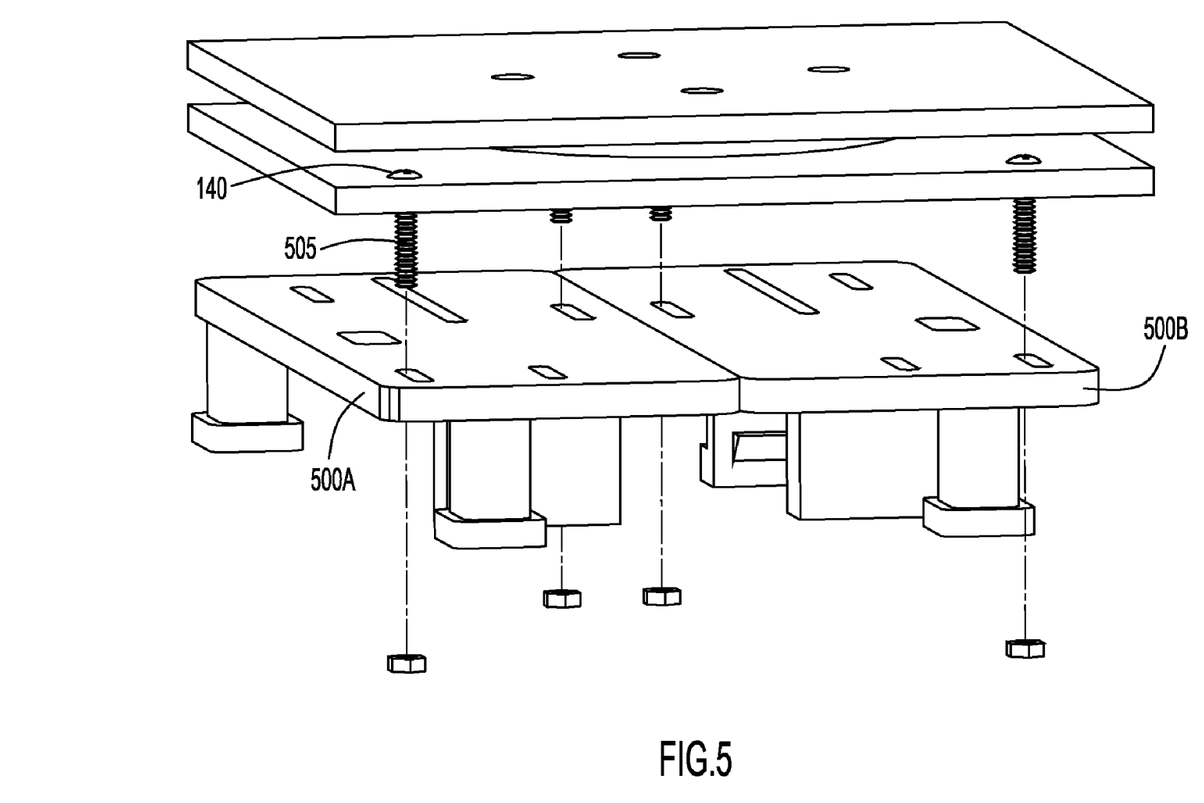
FIG. 5 illustrates the tool repositioning assembly of FIG. 1 coupled to a support assembly.

The base 120 is configured to couple directly to a workbench and/or to a support assembly. As with the tool platform 110, the base 120 may be a in the form of a generally planar element, and may include mounting brackets that capture the crossbeam of a workbench. The base 120 may further include one or more connection points 140 that receive fasteners operable to secure the base to a support assembly. Referring to FIG. 5, the support assembly may include one or more support paddles or brackets that mount to a workbench. By way of specific example, the support brackets may possess a structure similar to that described in U.S. Patent Application Publication No. 2007/0131306 (Snider), the disclosure of which is hereby incorporated herein by reference in its entirety. In one embodiment, the support assembly includes a first support bracket 500A and a second support bracket 500B. Each support bracket 500A, 500B includes a body having a series of generally elongated mounting slots. Each slot may be selectively used to provide an appropriate connection between the tool repositioning device 10 and the support assembly (or the workbench when directly connected thereto). In operation, the base 120 is secured to the support brackets 500A, 500B via a fastener 505 such as a bolt, screw, etc. The fastener 505 extends through the connection point 140 in the base 120 and a corresponding slot on the bracket 500A, 500B, securing the tool repositioning assembly to the support assembly.

The tool support brackets 500A, 500B may be free standing (thus capable of being set on a supporting surface such as the ground), and/or may be adapted to mount onto the beam of a workbench. These features are discussed in the Patent Application Publication to Snider, already incorporated by reference in its entirety, above.

Referring back to FIG. 2, a reorientation mechanism 200 is configured to permit the relative movement of tool platform 110 with respect to the base 120, and vice versa. By way of example, the reorientation mechanism 200 may be a rotational coupling that permits the rotation the tool platform 110 with respect to the base 120. The rotational coupling may include an upper plate or disc 210 and a lower plate or disc 220 having a series of bearings 230 interposed therebetween to facilitate relative rotation between the discs. For example, one or both discs may define a race 240 or bearing groove within which spherical roller bearings 230 move. By way of further example, the lower disc 220 may be a generally annular tray having a coaxial annular race with bearings 230 that support the upper disc 210 for rotation.

The outer peripheral edges of the discs 210, 220 may interlock to prevent separation of the discs in an axial direction. The upper disc 210 may be secured to the upper platform via fasteners 250A such as screws. Similarly, the lower disc 210 may be secured to the lower platform 120 via fasteners 250B such as screws.

Figure 6A:
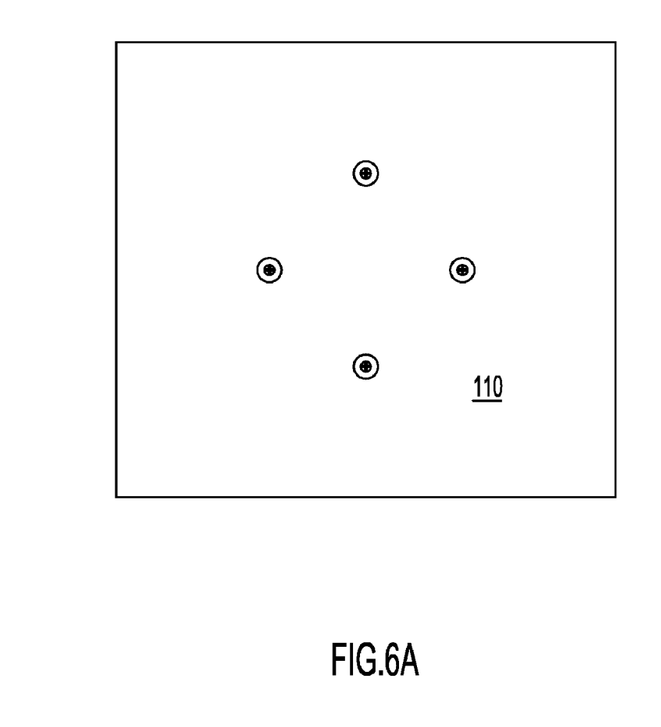
FIGS. 6A and 6B illustrate top views of the tool repositioning assembly of FIG. 1, showing repositioning of the tool platform from a first position (FIG. 5A) to a second position (FIG. 5B).
Figure 6B:
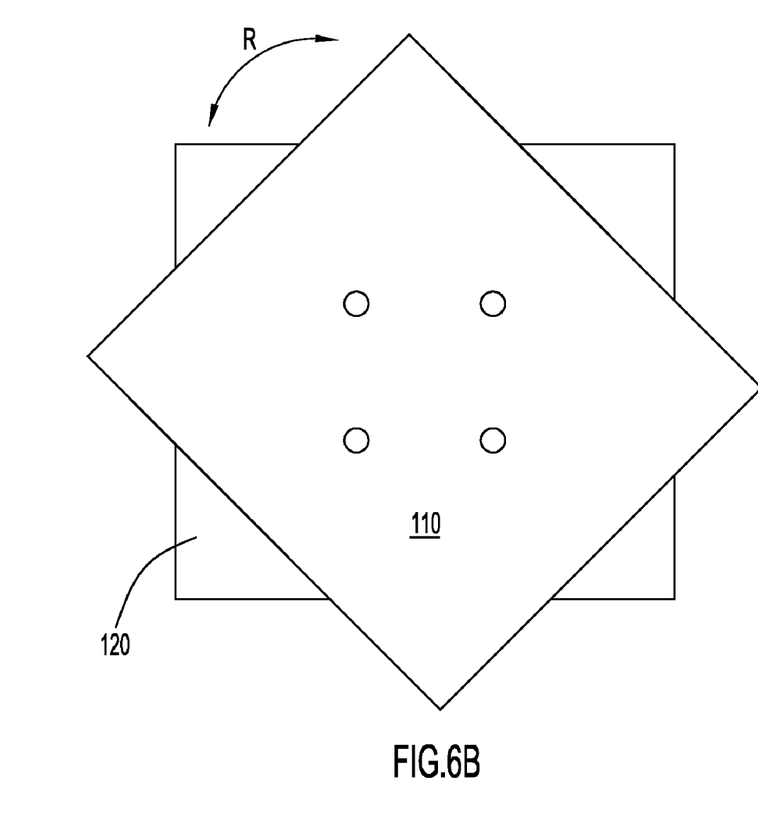

With the above described configuration, the tool platform 110 may be reoriented with respect to the base 120. Referring to embodiment of FIGS. 6A and 6B, the base 120 is fixed (e.g., to a workbench and/or support assembly) while the tool platform 110 is rotated (indicated by arrow R) from a first or normal (aligned) position (FIG. 6A) to a second or offset position (FIG. 6B). The degree of rotation between the tool platform 110 and the base 120 is not particularly limited. By way of example, the tool platform 110 may rotate 360° with respect to the base 120. Alternatively, the tool platform 110 may rotate less than 360°, having predetermined stops formed within the reorientation mechanism to limit the degree of rotation. For example, the tool platform 110 may be configured to rotate 90° (±45 from normal) with respect to the base 120. In addition, the tool platform 110 may be configured to rotate 180° (±90° from normal) with respect to the base 120.

The reorientation mechanism 200 may further include a detent operable to selectively secure the position of one disc 210, 220 with respect to the other disc 210, 220. For example, upward-extending protrusions may be provided at predetermined, angularly-spaced intervals about the axis of the lower disc 220. In addition, a detent having a recess may be provided on the upper disc 210. In operation, when positioned over the protrusion, the detent engages the protrusion to permit the angular positioning of the upper disc 210 with respect to the lower disc 220 and, as such, the tool platform 110 with respect to the base 120.

The tool repositioning assembly 10 may further include a lock mechanism operable to stabilize the tool platform 110, selectively preventing the rotation of the tool platform with respect to the base 120 (and vice versa).

Figure 7:
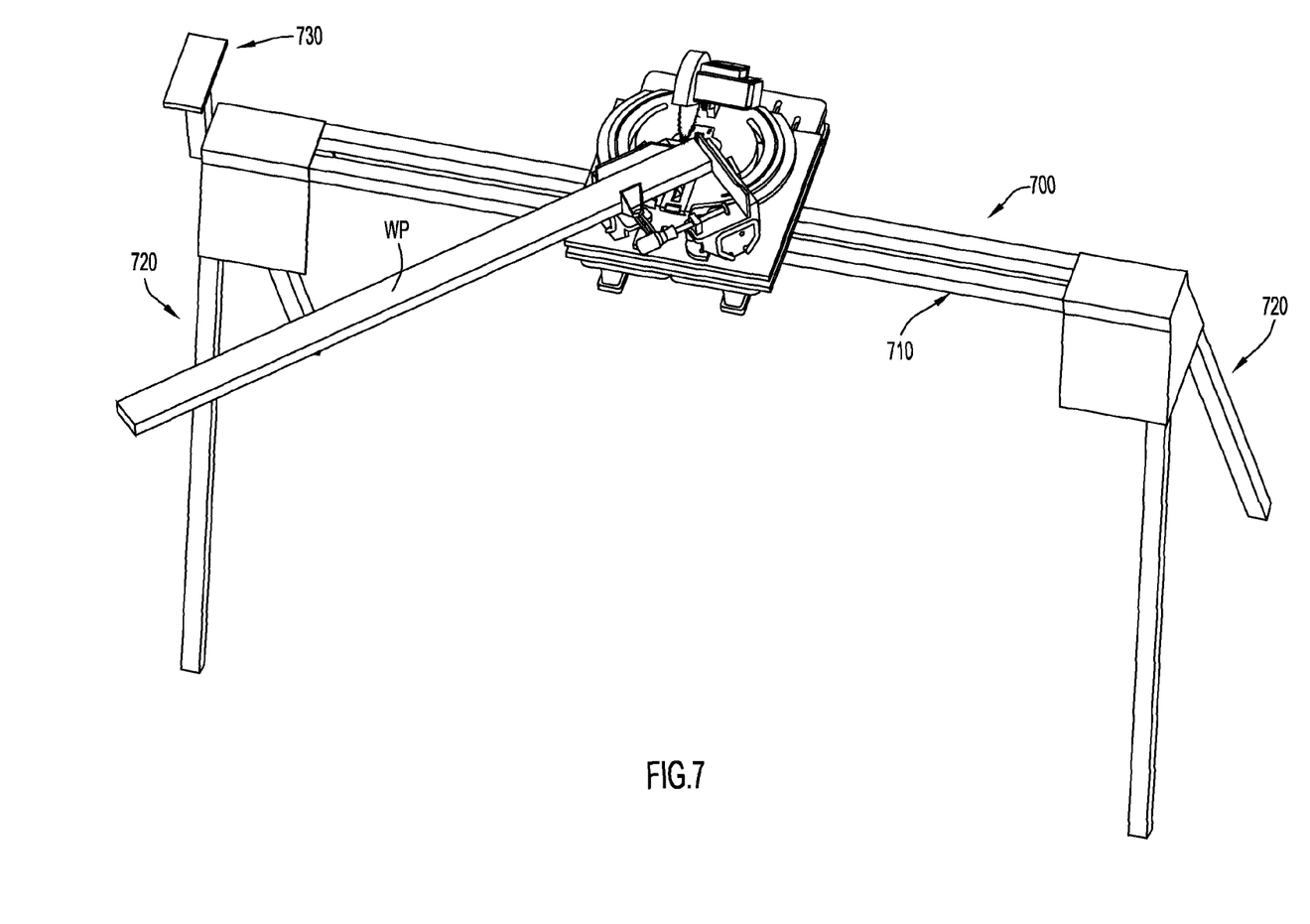
FIGS. 7 and 8 illustrate perspective views of a workbench, showing the operation of the tool repositioning assembly of FIG. 1.
Figure 8:
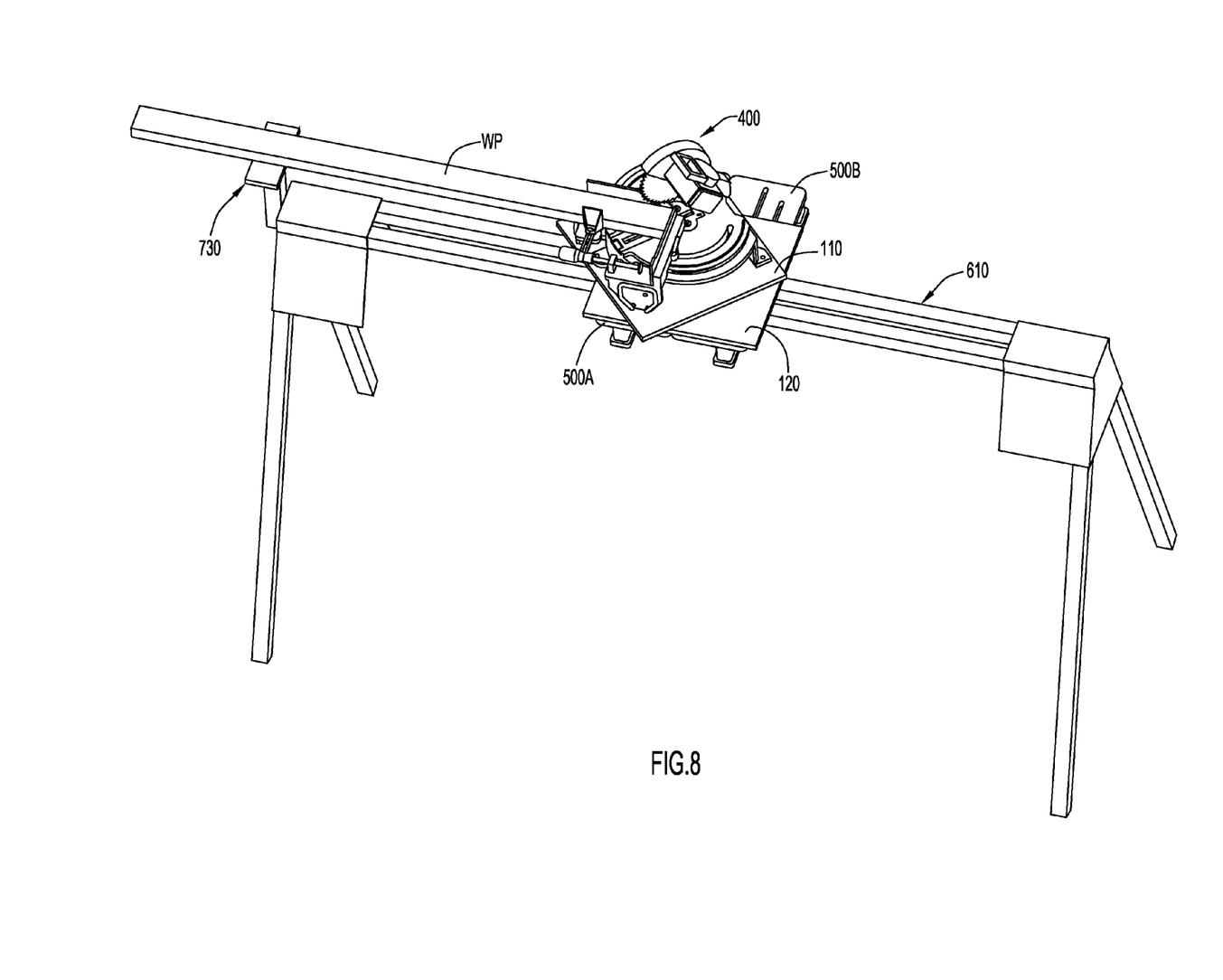

The operation of the support device in combination with a workbench is shown in FIGS. 7 and 8. The tool repositioning assembly 10 may be used with a workbench 700 having a horizontal cross beam 710 supported by one or more leg assemblies 720. The beam 710 may further include a work support 730 operable to support the distal portion of a workpiece WP. In operation, the tool repositioning assembly 10 is secured to the brackets 500A, 500B as described above. The brackets may be secured to the crossbeam 710, and the cutting tool 400 may be secured to the tool platform 110. Once a measurement taken and the fences 440, 450 are oriented in their desired position, a workpiece WP (e.g., board, molding, etc.) is placed against the fence 440, 450 such that the proximate end of the workpiece WP (i.e., the end to be cut) extends across the kerf slot 430 and into the path of the saw blade.

Since the 440, 450 fence is at an angle, however, the workpiece WP is not aligned with (parallel to) the crossbeam 710 of the workbench 700. Consequently, the distal end of the workpiece WP (the end positioned away from the drop saw 420) is not properly supported by the workbench 700, as illustrated in FIG. 7. Engaging the tool repositioning assembly 10 corrects this alignment. That is, the tool platform 110 is rotated, which, in turn, rotates the entire cutting tool 400. The platform 110 is rotated to generally align the workpiece WP with the crossbeam 710. Stated another way, the tool platform is rotated until the workpiece is oriented generally parallel to the beam 710 such that it is supported by the work support 730, as shown in FIG. 8. A user can then act upon the securely supported workpiece WP using the cutting tool 400, cutting the miter angles into the workpiece.

While the invention has been described in detail and with reference to specific embodiments thereof, it will be apparent to one skilled in the art that various changes and modifications can be made therein without departing from the spirit and scope thereof. For example, the material forming the device and its components is not particularly limited, and includes wood, composite material, metal, plastic, etc. The shape and dimensions of the tool platform 110 and/or base 120 is not limited. The tool platform 110 may include any suitable mechanism suitable for coupling the cutting tool (e.g., miter saw) to the platform.

Other mechanisms that permit the rotation of tool platform 110 with respect to the base 120 may be utilized. For example, the rotational coupling may be in the form of an annular retainer having a plurality of bearings held in circular holes along the rim of the retainer ring. The generally annular retainer, sandwiched between the tool platform and the base 120, may be connected to the platform/base via a central hub. While rotation in two directions (clockwise and counterclockwise) is illustrated, rotation in a single direction (e.g., by a ratchet mechanism) may also be utilized.

Other mechanisms capable of providing relative movement between the platform 110 and the base 120 may also be utilized. The movement is not limited to rotational movement and may include translational movement. Thus, while angular/rotational displacement is illustrated, other devices such as rails may be used to provide lateral/translational displacement between the platform 110 and the base 120.

The workbench 700 can be of any size and shape, and may be formed from any suitable materials. The tool support brackets 500A, 500B may be any size and shape suitable for its described purpose. For example, instead of the paddle-type brackets described, the brackets may be narrower brackets conventionally used with workbenches. By way of specific example, DEWALT tool mounting brackets having product no. DW7231 (available from Dewalt Industrial Tool Co., Baltimore, Md.) may be utilized. Other, conventional workbench and saw stand brackets may be utilized. The brackets, moreover, may be formed of any suitable materials.

Although support of a miter saw is disclosed, the device 10 may be used to support any tool, such as a chop saw, a drill press, a table saw, etc., any hand tools, or anything else that may need to be supported.

Thus, it is intended that the present invention cover the modifications and variations of this invention that come within the scope of the appended claims and their equivalents. For example, it is to be understood that terms such as "left", "right" "top", "bottom", "front", "rear", "side", "height", "length", "width", "upper", "lower", "interior", "exterior", "inner", "outer" and the like as may be used herein, merely describe points of reference and do not limit the present invention to any particular orientation or configuration.

I claim:

1. A method of forming a miter cut in a workpiece, the method comprising:
   (a) obtaining a cutting assembly comprising:
      a cutting tool including:
         a stationary cutting deck,
         a cutting blade
         a kerf slot formed into the cutting deck, and
         a fence operable to support a workpiece, the fence being movably connected to the cutting deck such that the fence is repositionable along the cutting deck to alter the miter angle of the fence with respect to the kerf slot, and
      a tool repositioning assembly including:
         a base,
         a tool support platform to support the cutting tool, wherein the deck is coupled to the tool support platform, and
         a reorientation mechanism interposed between the base and the tool support platform, the reorientation mechanism being operable to rotationally reposition the tool platform with respect to the base,
      wherein the cutting deck remains in a fixed rotational position relative to the tool support platform during movement of the fence, and wherein the tool repositioning assembly rotates the entire cutting tool to simultaneously reorient the cutting deck, the kerf slot, and the fence.
   (b) reorienting the fences along the cutting deck;
   (c) positioning a workpiece on the deck of the cutting device; and
   (d) reorienting the cutting tool by rotating the tool support platform a predetermined distance with respect to the base; and
   (e) engaging the cutting blade to act on the workpiece.

2. The method of claim 1, wherein (d) comprises (d.1) rotating the tool support platform about its axis.

3. The method of claim 2, wherein:
   the cutting assembly further comprises:
      a support stand including a crossbeam having an axis, the crossbeam having a first end and a second end, and
      a work support disposed along at least one of the ends; and
   the tool support axis is oriented generally perpendicular to the crossbeam axis.

4. The method of claim 3 further (d.1) comprises (d.2) rotating the tool support platform to generally align the workpiece with the crossbeam axis.

5. A position adjustable tool system for a cutting tool, the system comprising:
   a cutting tool including:
      a cutting blade,
      a stationary cutting deck,
      a kerf slot formed into the cutting deck, and a fence operable to support a workpiece, the fence being movably connected to the cutting deck such that the fence is repositionable along cutting deck to alter the miter angle of the fence with respect to the kerf slot; and
   a tool repositioning assembly comprising:
      a base,
      a tool platform operable to support the cutting tool, and
      a reorientation mechanism interposed between the base and the tool platform, the reorientation mechanism being operable to rotationally reposition the tool platform with respect to the base,
wherein the cutting deck remains in a fixed rotational position relative to the tool support platform during movement of the fence, and wherein the tool repositioning assembly rotates the entire cutting tool to simultaneously reorient the cutting deck, the kerf slot, and the fence.

6. The position adjustable tool system of claim 5, wherein the fence moves ±88° with respect to a normal position oriented perpendicular to the kerf slot.

7. The position adjustable tool system of claim 1, wherein the reorientation mechanism comprises:
a first member fixed to a surface of the tool support;
a second member fixed to a surface of base; and
a plurality of roller bearings captured between the first and second members.

8. The position adjustable tool system of claim 7, wherein the first and second members define a race that captures the bearings.

9. The position adjustable tool system of claim 5, wherein the base further includes a connection mechanism operable to couple the base to a crossbeam of a support stand.

10. The position adjustable tool system of claim 5, wherein:
the system includes a tool support stand including a crossbeam and a leg assembly operable to orient the crossbeam above a supporting surface; and
the base further includes a connection mechanism operable to couple the base to the crossbeam of the support stand.

11. The position adjustable tool system of claim 5, wherein the tool platform rotates 360° with respect to the base in at least one of a clockwise and counterclockwise direction.

12. The position adjustable tool system of claim 5, wherein the reorientation mechanism further comprises a stop operable to selectively prohibit the angular rotation of the tool platform with respect the base.

13. The position adjustable tool system of claim 12, wherein the stop limits the angular rotation of the tool platform to 180°.

14. The position adjustable tool system of claim 5, wherein the system further comprises a support assembly operable to couple to the tool repositioning assembly and to support the tool repositioning assembly over a supporting surface.

15. The position adjustable tool system of claim 14, wherein the support assembly comprises a first bracket and a second bracket, the brackets configured to connect to the cross beam of a saw stand, each bracket including a body having a plurality of elongated mounting slots formed therein, the tool repositioning device being connected to the brackets via the mounting slots.

16. The position adjustable tool system of claim 5, wherein the tool platform comprises a generally planar element including a plurality of first connection points configured to align with corresponding second connection points disposed on the cutting device.

17. A workbench tool system comprising:
a workbench including:
an elongated crossbeam comprising a rail, the crossbeam having an axis, and
a leg assembly operable to support the crossbeam over a supporting surface;
a tool repositioning device comprising:
a tool platform,
a base including a connection mechanism operable to couple to the rail of the crossbeam, and
a reorientation mechanism interposed between the tool platform and the base, the reorientation mechanism operable to permit the movement of the tool platform with respect to the base, wherein the base is fixed to the workbench, and wherein the tool platform is configured to rotate about an axis oriented generally perpendicular to the axis of the cross beam; and
a cutting tool including a cutting blade and including a stationary cutting deck, a kerf slot formed into the cutting deck, a first fence disposed along a first side of the kerf slot and a second fence disposed along a second side of the kerf slot, wherein each fence is movably connected to the stationary cutting deck,
wherein the cutting deck remains in a fixed rotational position relative to the tool support platform during movement of the fence, and wherein the tool repositioning device rotates the entire cutting tool to simultaneously reorient the rotational position of the cutting deck, the kerf slot, and the fence with respect to the workbench.

18. The workbench tool system of claim 17, wherein the reorientation mechanism comprises:
a first disc coupled to a surface of the tool support;
a second member coupled to a surface of base; and
a plurality of roller bearings captured between the first and second discs.

19. The workbench tool system of claim 18, wherein:
the first and second members define a race; and
the bearings are captured within the race.

20. The workbench tool system of claim 17, wherein the connection mechanism comprises a support paddle configured to couple to the rail of the crossbeam, wherein the base couples to the support paddle.

21. The position adjustable tool system of claim 17, wherein the tool platform rotates 360° with respect to the base in at least one of a clockwise and counterclockwise direction.

* * * * *